(12) United States Patent
Saitou et al.

(10) Patent No.: US 7,073,354 B2
(45) Date of Patent: Jul. 11, 2006

(54) METHOD FOR MANUFACTURING OPTICAL FIBER PREFORM AND BURNER APPARATUS FOR THIS METHOD FOR MANUFACTURING OPTICAL FIBER PREFORM

(75) Inventors: Manabu Saitou, Sakura (JP); Masahiro Horikoshi, Sakura (JP)

(73) Assignee: Fujikura Ltd., Tokyo (JP)

( * ) Notice: Subject to any disclaimer, the term of this patent is extended or adjusted under 35 U.S.C. 154(b) by 438 days.

(21) Appl. No.: 10/353,279

(22) Filed: Jan. 29, 2003

(65) Prior Publication Data

US 2006/0096326 A1    May 11, 2006

(30) Foreign Application Priority Data

Feb. 1, 2002    (JP) ............................ 2002-025373

(51) Int. Cl.
*C03B 37/18*    (2006.01)
(52) U.S. Cl. .............................. 65/413; 65/415; 65/421
(58) Field of Classification Search .......... 65/413–422, 65/529–532
See application file for complete search history.

(56) References Cited

U.S. PATENT DOCUMENTS

| | | | |
|---|---|---|---|
| 4,310,339 A | 1/1982 | Blankenship | |
| 4,627,867 A | 12/1986 | Tanaka et al. | |
| 4,661,140 A | 4/1987 | Takimoto et al. | |
| 4,810,189 A | 3/1989 | Mikami et al. | |
| 2001/0047666 A1* | 12/2001 | Sugiyama et al. | ............. 65/27 |
| 2004/0112092 A1* | 6/2004 | Roba et al. | .................. 65/414 |

FOREIGN PATENT DOCUMENTS

| | | |
|---|---|---|
| JP | 3-9047 | 2/1986 |
| JP | 09-030817 | 2/1997 |
| JP | 09-301719 | 11/1997 |
| JP | 2003-165737 | 6/2003 |
| WO | WO 99/43625 | 9/1999 |

* cited by examiner

*Primary Examiner*—Sean Vincent
(74) *Attorney, Agent, or Firm*—Hoffmann & Baron, LLP

(57) ABSTRACT

The present invention provides an optical fiber preform manufacturing method and a burner apparatus employed for this method. In this manufacturing method, when glass particles are synthesized in an oxy-hydrogen flame emitted from a burner to form a porous optical fiber preform by depositing glass particles in the radial direction of a starting member, the relationship between the flow rate vm (m/sec) of a source material gas or a mixed gas of the source material gas and an additive gas discharged from the burner, and the flow rate vs (m/sec) of an inert gas is such that $-0.06\,vm+1.4 \leqq vs \leqq -0.02\,vm+1.8$, and $vs \geqq 0.40$, while the relationship between the flow volume Vm (l/min) of the source material gas discharged from the burner and the flow volume Vs (l/min) of the inert gas is such that $Vs/Vm \leqq 0.2$.

7 Claims, 2 Drawing Sheets

METHOD FOR MANUFACTURING OPTICAL FIBER PREFORM AND BURNER APPARATUS FOR THIS METHOD FOR MANUFACTURING OPTICAL FIBER PREFORM

The application claims priority from Japanese Patent Application No. 2002-025373 filed on Feb. 1, 2002.

BACKGROUND OF THE INVENTION

1. Field of the Invention

The present invention relates to a method for manufacturing optical fiber preform, and a burner apparatus employed for manufacturing an optical fiber preform that uses this method, in which glass particles are synthesized by reacting a source material gas in oxy-hydrogen flame, and depositing it in the radial direction of the outer periphery of a starting member.

2. Description of the Related Art

Optical fibers are manufactured by drawing an optical fiber preform.

In addition, examples of methods for manufacturing optical fiber preforms include VAD, OVD, MCVD and PCVD methods. In particular, OVD (Outside Vapor Phase Deposition) method is a method for manufacturing optical fiber preforms consisting of synthesizing glass particles by hydrolyzing or oxidizing silicon tetrachloride ($SiCl_4$), germanium tetrachloride ($GeCl_4$) and so forth in flame together with oxygen and hydrogen, depositing the glass particles (soot) in the radial direction of the outer periphery of a conical starting member provided with a glass material that is provided as a core and rotates around its axis to manufacture a porous optical fiber preform by forming a porous layer composed of multiple layers, and converting it to transparent glass while dehydrating and sintering in an electric oven.

The optical fiber manufactured by drawing this optical fiber preform has superior purity and other qualities.

In the OVD method, an end of a burner 10 used in the step in which the porous optical fiber preform is formed has a structure as shown in FIG. 1, for example.

A first nozzle 1 is provided in the center on the end of this burner 10, and a second nozzle 2 is provided on the same central axis as first nozzle 1 around this first nozzle 1. In addition, a third nozzle 3 is similarly provided on the same central axis as first nozzle 1 around the second nozzle 2, and a fourth nozzle 4 is provided on the same central axis as the first nozzle 1 around the third nozzle 3. In addition, a plurality of fifth nozzles 5 having narrow diameter are provided on the concentric circle of the first nozzle 1 between the second nozzle 2 and third nozzle 3.

In addition, the first nozzle 1 serves as a first port 11, the section between the first nozzle 1 and second nozzle 2 serves as a second port 12, the second between the second nozzle 2 and third nozzle 3 serves as a third port 13, the section between the third nozzle 3 and fourth nozzle 4 serves as a fourth port 14, and the fifth nozzle 5 serve as fifth ports 15.

In order to synthesize glass particles in the OVD method, typically, a mixed gas of, for example, $SiCl_4$ and an additive gas such as oxygen or hydrogen, is supplied as a source material gas from the first port 11, a sealing gas comprised of argon and so forth is supplied from the second port 12, hydrogen is supplied from the third port 13, and oxygen is supplied from the fourth port 14 and fifth ports 15.

However, the method for manufacturing optical fiber preform using this burner 10 had the following problems.

When the source material gas, oxygen and hydrogen are supplied into the oxy-hydrogen flame of the burner 10, glass particles are synthesized by a hydrolysis reaction (flame hydrolysis) that occurs in the flame. Although these glass particles are normally deposited on the surface of the starting member, a part of them adhere to the end of the burner 10. In this manner, when the glass particles adhere to the end of the burner 10, the above ports become blocked causing problems such as a defective manufacture of the porous optical fiber preform.

Furthermore, aggregates of the glass particles ($SiO_2$ particles) that have adhered to the end of the burner 10 also adhere to the surface of the porous optical fiber preform after having separated from the burner 10. If the porous optical fiber preform is sintered in this state, bubbles form within the optical fiber preform, thereby preventing the manufacture of a satisfactory optical fiber preform.

In addition, accompanying the increase in demand for high-speed communications in recent years, the manufacture volume of the optical fibers has increased, and the optical fiber preforms are tending to become larger. As a result, the amount of the source material gas used has also increased, thereby resulting in a corresponding increase in the amount of the glass particles adhering to the end of the burner, which in turn has caused the above problems to become more serious.

SUMMARY OF THE INVENTION

In consideration of the above circumstances, the object of the present invention is to provide a method for manufacturing optical fiber preform that allows efficient manufacture of satisfactory optical fiber preforms and a burner apparatus employed for manufacturing optical fiber preform that uses this method.

The above problems are able to be solved by an optical fiber preform manufacturing method comprising steps of generating glass particles within an oxy-hydrogen flame discharged from a burner equipped with at least a first port that discharges a source material gas or a mixed gas of the source material gas and an additive gas provided in the center, and a second port that discharges an inert gas provided on the same central axis as the first port around the first port, manufacturing a porous optical fiber preform by depositing the glass particles in the radial direction of an outer periphery of a starting member, and sintering the porous optical fiber perform; and relationship between a flow rate vm (m/sec) of the source material gas or the mixed gas of the source material gas and additive gas discharged from the burner, and a flow rate vs (m/sec) of the inert gas is such that $-0.06\ vm+1.4 \leq vs \leq -0.02\ vm+1.8$, and $vs \geq 0.40$.

In the above method for manufacturing optical fiber preform, relationship between a flow volume Vm (l/min) of the source material gas and a flow volume Vs (l/min) of the inert gas is preferably such that $Vs/Vm \leq 0.2$.

In the above method for manufacturing optical fiber preform, the additive gas added to the source material gas is preferably oxygen or hydrogen.

The above problems can also be solved by a burner apparatus for manufacturing optical fiber preform having sizes of gas flow paths that are applicable to the above method for manufacturing optical fiber perform, and comprising: a burner equipped with at least a first port that discharges the source material gas or the mixed gas of the source material gas and additive gas provided in the center, and a second port that discharges the inert gas provided on the same central axis as the first port around the first port; a gas supply source that supplies the source material gas, a flammable gas, a combustion supporting gas and the inert gas to the burner; and a gas control unit that controls flow volume or flow rate of these gases.

DESCRIPTION OF THE PREFERRED EMBODIMENTS

The following provides a detailed explanation of the present invention.

Figure 1:
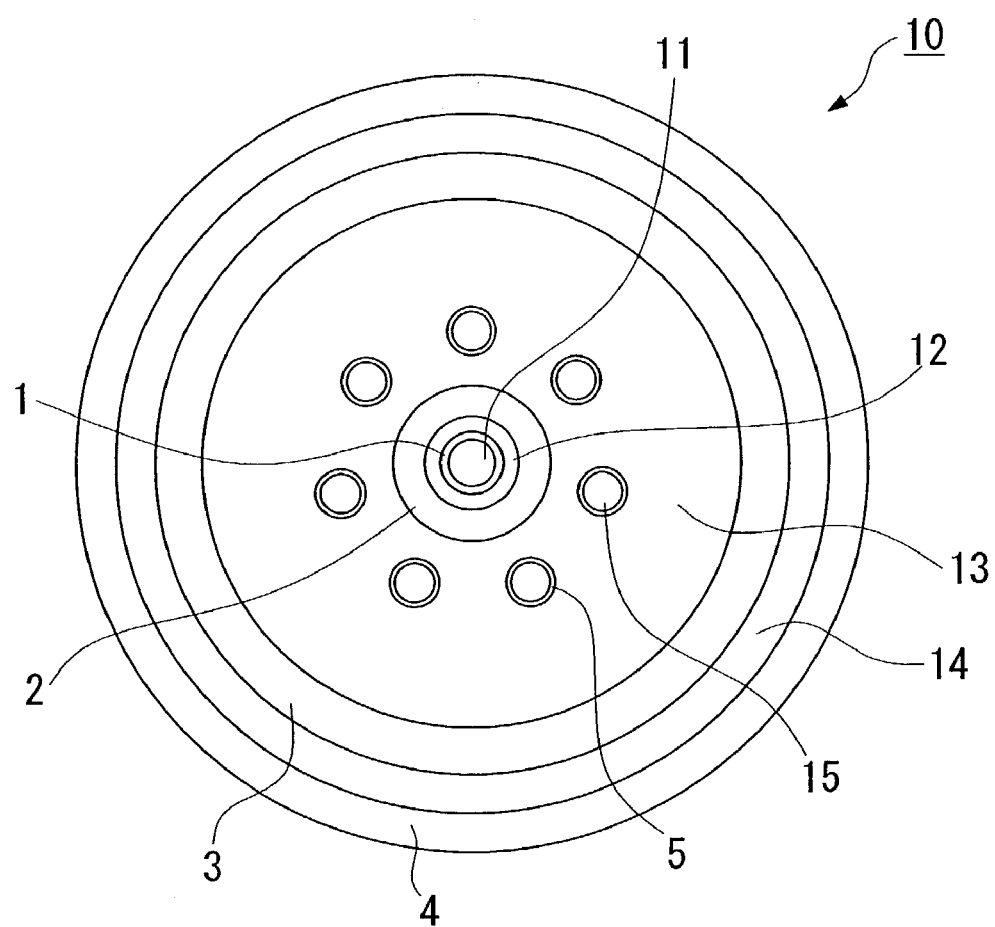
FIG. 1 is a schematic drawing which shows an example of a burner used for manufacturing an optical fiber preform.

FIG. 1 is a schematic block drawing which shows an example of a burner used in the method for manufacturing optical fiber perform, however, explanations of respective reference symbols will be omitted.

A burner apparatus for manufacturing an optical fiber preform of the present invention is roughly composed of the burner 10 as shown in this figure for example, a gas supply source which supplies a source material gas, a flammable gas, a combustion supporting gas and an inert gas to this burner 10 and is not shown the figure, and a control unit which controls the flow volume or flow rate of these gases and is not shown the figure.

The burner 10 has a cylindrical shape of an external diameter of about 40 through 60 mm, and is typically formed from silica glass.

In addition, the inner diameter of the first nozzle 1 is about 2.5 through 6 mm, the inner diameter of the second nozzle 2 is about 4 through 10 mm, the inner diameter of the third nozzle 3 is about 25 through 45 mm, the inner diameter of the fourth nozzle 4 is about 35 through 55 mm, and the inner diameter of each fifth nozzle 5 is about 1 through 2 mm. In addition, the distance from the center of the first nozzle 1 to the center of the fifth nozzles 5 is about 10–30 mm.

An optical fiber preform can be manufactured in the manner described below by making the inner diameter of each nozzle that composes the burner 10 to be within the above ranges.

The gas supply source is composed of gas tanks (not shown) filled with the source material gas, oxygen, hydrogen, inert gas and so forth, and is connected to the rear end of the burner 10 by means of a gas supply line (not shown).

In addition, the gas control unit is composed of solenoid valves, flow volume controllers and so forth, is provided at an intermediate point in the above gas supply line, and controls the flow volume or flow rate of gases by means of this flow volume controller.

In the method for manufacturing optical fiber preform of the present invention, firstly, the source material gas such as $SiCl_4$ or $GeCl_4$, or a mixed gas of the source material gas and an additive gas such as oxygen ($O_2$) or hydrogen ($H_2$) etc., is supplied from the first port 11, a sealing gas comprised of the inert gas such as argon (Ar) is supplied from the second port 12, the flammable gas such as hydrogen is supplied from the third port 13, and the combustion supporting gas such as oxygen is supplied from the fourth port 14 and fifth ports 15 of burner 10, onto the surface of a cylindrical starting member provided with a glass material that is provided as a core and rotates around its axis. As a result, glass particles are synthesized by a hydrolysis reaction within the oxy-hydrogen flame of the burner 10, and these glass particles are deposited in the radial direction on the surface of the starting member to obtain a porous optical fiber preform. In this case, the sealing gas discharged from the second port 12 inhibits the synthesis of the glass particles caused by a hydrolysis reaction in the vicinity of the end of the burner 10 as a result of contact of the source material gas supplied from the first port 11 and water vapor which is caused by a reaction between the combustion supporting gas supplied from the fifth ports 15 and the flammable gas supplied from the third port 13.

Next, the resulting porous optical fiber preform is placed in an electric oven, and is sintered to transparent glass while dehydrating in helium (He) or other inert gas atmosphere to obtain a cylindrical optical fiber preform.

Here, when the flow rate of the source material gas or the mixed gas of the source material gas and additive gas discharged from the first port 11 is denoted to be vm (m/sec), and the flow rate of the sealing gas discharged from the second port 12 is denoted to be vs (m/sec), the relationship between these two flow rates is preferably such that $-0.06$ vm+1.4$\leq$vs$\leq$$-0.02$ vm+1.8, and vs$\geq$0.40, and more preferably such that $-0.06$ vm+1.5$\leq$vs$\leq$$-0.02$ vm+1.7, and vs$\geq$0.5.

Figure 2:
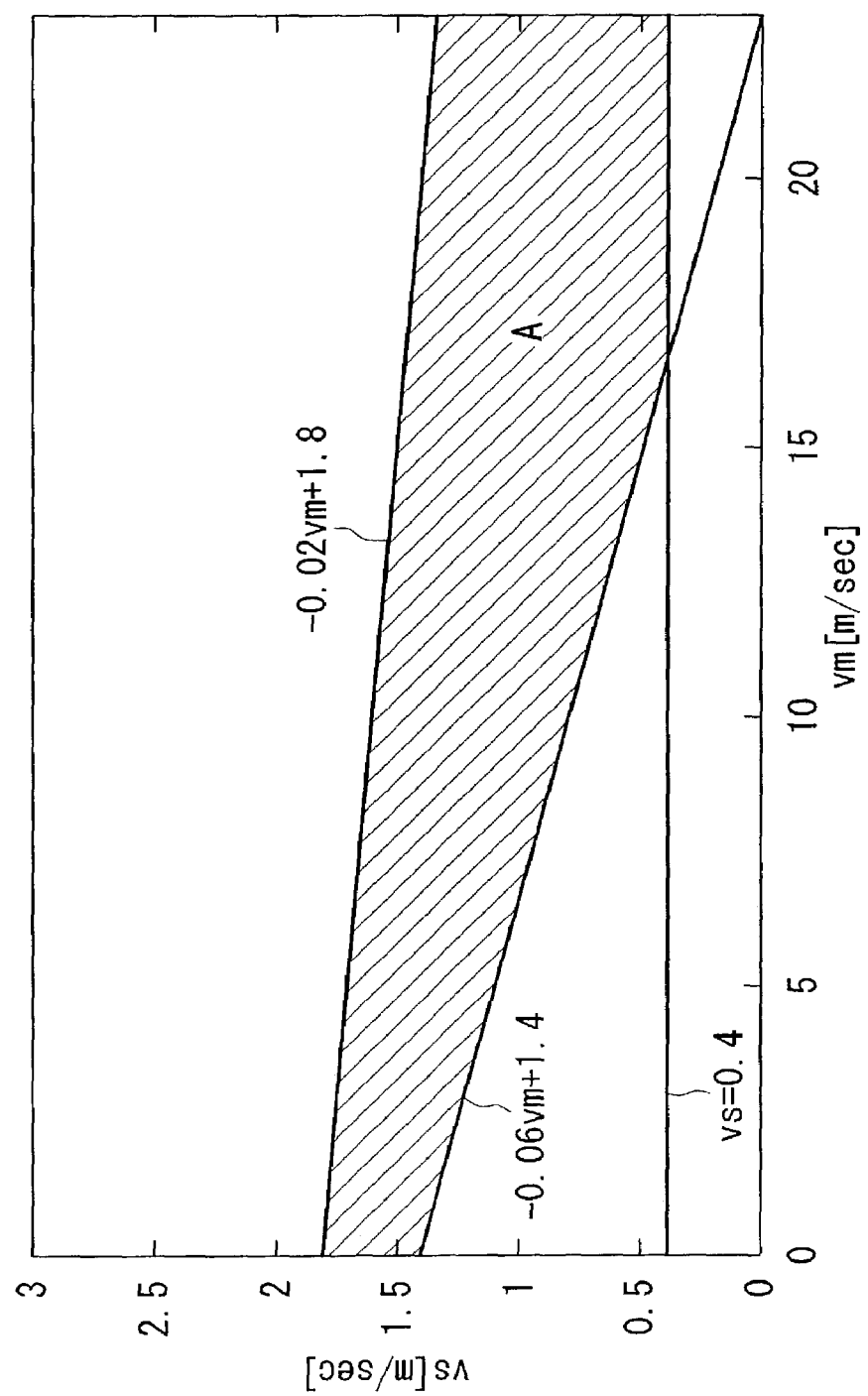
FIG. 2 is a graph showing the relationship between the flow rate vm (m/sec) of a source material gas or a mixed gas of the source material gas and an additive gas and the flow rate vs (m/sec) of an inert gas in the method for manufacturing optical fiber perform according to the present invention.

FIG. 2 is a graph showing the relationship between the flow rate vm (m/sec) of the source material gas or the mixed gas of the source material gas and additive gas, and the flow rate vs (m/sec) of the sealing gas in the method for manufacturing optical fiber preform of the present invention. The portion indicated by A in the drawing indicates the preferable range.

If the flow rate vs of the sealing gas is less than $-0.06$ vm+1.4 (m/sec), the source material gas and water vapor in the oxy-hydrogen flame react in the vicinity of the gas synthesis burner 10 resulting in the synthesis of the glass particles and increased susceptibility to adherence of those glass particles to the surface of the burner 10. If flow rate vs of the sealing gas exceeds $-0.02$ vm+1.8 (m/sec), the efficiency of the hydrolysis reaction in the oxy-hydrogen flame decreases during synthesis of the glass particles, which in turn causes a decrease in the rate at which the glass particles are deposited on the surface of the starting member. In addition, if flow rate vs of the sealing gas is less than 0.40 (m/sec), the effect of the sealing gas is not adequately obtained.

In the method for manufacturing optical fiber preform of the present invention, if the flow volume of the source material gas or the mixed gas of the source material gas and additive gas discharged from the first port 11 is taken to be Vm (1/min), and the flow volume of the sealing gas composed of the inert gas such as argon the discharged from second port 12 is taken to be Vs (1/min), the relationship between these flow volumes is preferably such that Vs/Vm$\leq$0.2, and practically 0.15–0.2. If Vs/Vm exceeds 0.2, the flow volume of the sealing gas becomes excessively large, which is undesirable since it causes a decrease in the reaction efficiency with the source material gas.

According to the method for manufacturing optical fiber preform of the present invention, the adherence of the glass particles to the end of the burner is eliminated during formation of the porous optical fiber preform. In addition, since the rate at which the glass particles are deposited on the surface of the starting member can be increased, manufacture efficiency is improved.

In addition, according to the burner apparatus employed for the manufacturing optical fiber preform of the present invention, since the deposition rate of the glass particles can be increased without adherence of the glass particles to the end of the burner even if the amount of the sealing gas used is reduced, manufacture costs can be decreased.

The following indicates specific embodiments of the present invention using FIG. 1 to clarify the effects of the present invention.

Embodiment 1

Firstly, a cylindrical starting member composed of silica glass was prepared. Next, both ends of this starting member were clamped with clamps, and the starting member was arranged horizontally. Furthermore, while rotating this starting member about its central axis, glass particles were synthesized simultaneously using a plurality of burners like that shown in FIG. 1, and the glass particles were deposited in the radial direction on the rotating starting member while the moving burners 10 parallel to the longitudinal direction of the starting member to obtain a cylindrical porous optical fiber preform.

At this time, other porous optical fiber preforms were manufactured while changing the flow volumes of the source material gas and the oxygen and sealing gas used as additive gases as well as while changing the flow rates of the source material gas, oxygen and sealing gases followed by measurement of the deposition rate of the glass particles and confirming the presence of adherence of the glass particles on the end of the burners 10.

Those results are shown in Table 1.

TABLE 1

| | Sample No. | | | | | |
|---|---|---|---|---|---|---|
| | 1 | 2 | 3 | 4 | 5 | 6 |
| Source material gas flow volume Vm (l/min) | 6.0 | 6.0 | 6.0 | 6.0 | 5.0 | 5.0 |
| Oxygen flow volume (l/min) | 3.0 | 3.0 | 3.0 | 3.0 | 2.0 | 2.0 |
| Source material gas flow rate vm (m/sec) | 6.3 | 6.3 | 6.3 | 6.3 | 4.9 | 4.9 |
| Sealing gas flow volume Vs (l/min) | 1.0 | 1.5 | 2.0 | 2.5 | 1.0 | 1.5 |
| Sealing gas flow rate vs (m/sec) | 0.75 | 1.12 | 1.49 | 1.87 | 0.75 | 1.12 |
| −0.06 vm + 1.4 (m/sec) | 1.02 | 1.02 | 1.02 | 1.02 | 1.11 | 1.11 |
| −0.02 vm + 1.8 (m/sec) | 1.67 | 1.67 | 1.67 | 1.67 | 1.70 | 1.70 |
| Vs/Vm | 0.17 | 0.25 | 0.33 | 0.42 | 0.20 | 0.30 |
| Adherence of glass particles on burner end | Yes | No | No | No | Yes | No |
| Deposition rate of glass particles (g/min) | 25.1 | 24.7 | 24.5 | 17.7 | 21.2 | 21.3 |

On the basis of the results of Table 1, when the sealing gas flow rate vs was less than −0.06 vm+1.4, the glass particles were confirmed to adhere to the end of the burners 10, and when the sealing gas flow rate vs exceeded −0.02 vm+1.8, the deposition rate of the glass particles was confirmed to decrease.

Embodiment 2

With the exception of reducing the cross-sectional area of the second port 12 of the burners 10 used in Embodiment 1, the porous optical fiber preforms were manufactured in the same manner as Embodiment 1, the deposition rates of the glass particles were measured, and the presence of adherence of the glass particles to the end of the burners 10 was confirmed.

Those results are shown in Table 2.

TABLE 2

| | Sample No. | | | | | |
|---|---|---|---|---|---|---|
| | 1 | 2 | 3 | 4 | 5 | 6 |
| Source material gas flow volume Vm (l/min) | 6.0 | 6.0 | 6.0 | 6.0 | 5.0 | 5.0 |
| Oxygen flow volume (l/min) | 3.0 | 3.0 | 3.0 | 3.0 | 2.0 | 2.0 |
| Source material gas flow rate vm (m/sec) | 6.3 | 6.3 | 6.3 | 6.3 | 4.9 | 4.9 |
| Sealing gas flow volume Vs (l/min) | 1.0 | 1.2 | 1.5 | 2.0 | 1.0 | 1.5 |
| Sealing gas flow rate vs (m/sec) | 1.16 | 1.40 | 1.75 | 2.33 | 1.11 | 1.11 |
| −0.06 vm + 1.4 (m/sec) | 1.02 | 1.02 | 1.02 | 1.02 | 1.11 | 1.11 |
| −0.02 vm + 1.8 (m/sec) | 1.67 | 1.67 | 1.67 | 1.67 | 1.70 | 1.70 |
| Vs/Vm | 0.17 | 0.20 | 0.25 | 0.33 | 0.20 | 0.30 |
| Adherence of glass particles on burner end | No | No | No | No | No | No |
| Deposition rate of glass particles (g/min) | 25.8 | 25.6 | 18.4 | 17.9 | 21.6 | 21.2 |

On the basis of the results of Table 2, although the deposition rate of the glass particles was confirmed to decrease when the sealing gas flow rate vs exceeded −0.02 vm+1.8, the deposition rate was confirmed to be able to increased even if the flow volume of the sealing gas was lower than Embodiment 1.

What is claimed is:

1. A method of manufacturing an optical fiber preform comprising the steps of:

generating glass particles with an oxy-hydrogen flame discharged from a burner equipped with at least a first port that discharges a source material gas or a mixed gas of said source material gas and an additive gas provided in the center, and a second port that discharges an inert gas provided on the same central axis as said first port around said first port;

manufacturing a porous optical fiber preform by depositing said glass particles in the radial direction of an outer periphery of a starting member;

sintering said porous optical fiber preform; and maintaining a relationship between a flow rate vm (m/sec) of said source material gas or said mixed gas of said source material gas and said additive gas discharged from said burner, and a flow rate vs (m/sec) of said inert gas which eliminates adherence of said glass particles to an end surface of said burner such that $-0.06\ vm+1.4 \leq vs \leq -0.02\ vm+1.8$, and $vs \geq 0.40$.

2. A method of manufacturing an optical fiber preform according to claim 1 wherein, a relationship between a flow volume Vm (l/min) of said source material gas and a flow volume Vs (l/min) of said inert gas is such that $Vs/Vm \leq 0.2$.

3. A method of manufacturing an optical fiber preform according to claim 1 wherein, said additive gas added to said source material gas is oxygen or hydrogen.

4. A method of manufacturing an optical fiber preform according to claim 2 wherein, said additive gas added to said source material gas is oxygen or hydrogen.

5. A method of manufacturing an optical fiber preform comprising the steps of:
- producing glass particles with an oxy-hydrogen flame discharged from a burner equipped with at least a first port that discharges a source material gas or a mixed gas of said source material gas and an additive gas provided in the center, and a second port that discharges an inert gas provided on the same central axis as said first port around said first port;
- discharging said inert gas at a flow rate vs of greater than or equal to 0.40 m/sec;
- depositing said glass particles in a radial direction of an outer periphery of a starting member to form a porous optical fiber preform;
- maintaining the flow rate vs (m/sec) of said inert gas relative to a flow rate vm of said source material gas or said mixed gas of said source material gas and said additive gas discharged from said burner such that adherence of said glass particles to an end surface of said burner is eliminated without decreasing a rate at which said glass particles are deposited on said starting member; and
- sintering said porous optical fiber preform.

6. The method of claim 5, wherein said maintaining step comprises maintaining a relationship between said flow rate vm (m/sec) of said source material gas or said mixed gas of said source material gas and said additive gas discharged from said burner, and said flow rate vs (m/sec) of said inert gas such that $$-0.06\, vm+1.4 \leq vs \leq -0.02\, vm+1.8,\ \text{and}\ vs \geq 0.40.$$

7. The method of claim 6, wherein said producing step comprises discharging said source material gas or said mixed gas of said source material gas and said additive gas through an inner diameter of said first port of less than or equal to 6 millimeters.

* * * * *